US008135119B1

(12) United States Patent
Zhao et al.

(10) Patent No.: US 8,135,119 B1
(45) Date of Patent: Mar. 13, 2012

(54) TECHNIQUES FOR PROTECTING TELEPHONE USERS FROM CALLER ID SPOOFING ATTACKS

(75) Inventors: Xiaoming Zhao, Jiangsu (CN); Gang Chen, Jiangsu (CN); Kan Dong, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 726 days.

(21) Appl. No.: 12/264,514

(22) Filed: Nov. 4, 2008

(51) Int. Cl.
H04M 1/56 (2006.01)
(52) U.S. Cl. ............... 379/142.05; 370/352; 379/88.21; 379/142.06; 379/201.11; 455/410; 455/415; 709/201; 709/229
(58) Field of Classification Search .......... 370/259–271, 370/351–356; 379/88.21, 142.02, 142.05, 379/142.06, 142.15, 201.11, 207.13; 455/410–420, 455/426.1, 426.2, 550.1–560; 709/201–207, 709/217–244
See application file for complete search history.

(56) References Cited

U.S. PATENT DOCUMENTS

| | | | |
|---|---|---|---|
| 5,897,616 A * | 4/1999 | Kanevsky et al. ............ | 704/246 |
| 7,155,001 B2 * | 12/2006 | Tiliks et al. ................... | 379/196 |
| 7,324,946 B2 * | 1/2008 | Novack et al. ................ | 704/273 |
| 2003/0156693 A1 * | 8/2003 | Goldman ................. | 379/142.01 |
| 2003/0235281 A1 * | 12/2003 | Williams et al. ............. | 379/196 |
| 2004/0066916 A1 * | 4/2004 | Brown et al. ............. | 379/88.01 |
| 2006/0147014 A1 * | 7/2006 | Smith et al. ............. | 379/210.02 |
| 2007/0036136 A1 * | 2/2007 | Barclay et al. ................ | 370/352 |
| 2007/0042755 A1 * | 2/2007 | Singhal ......................... | 455/411 |
| 2007/0201443 A1 * | 8/2007 | Saha et al. .................... | 370/356 |
| 2008/0089501 A1 | 4/2008 | Benco et al. | |
| 2008/0159488 A1 * | 7/2008 | Raja ........................... | 379/88.02 |
| 2008/0159501 A1 * | 7/2008 | Cai ........................... | 379/142.05 |
| 2008/0181379 A1 * | 7/2008 | Chow et al. ............. | 379/142.05 |
| 2008/0200156 A1 * | 8/2008 | Hicks et al. .................... | 455/415 |
| 2009/0217039 A1 * | 8/2009 | Kurapati et al. ............. | 713/168 |

OTHER PUBLICATIONS

CallerIDSpoofing.info—PhoneGangster Caller ID Spoofing Service, 2 sheets [retrieved on Oct. 28, 2008]. Retrieved from the internet: http://www.calleridspoofing.info/phonegangster.php.
CallerIDSpoofing.info—Everything You Ever Wanted to Know About Caller ID Spoofing, 7 sheets [retrieved on Oct. 29, 2008]. Retrieved from the internet: http://www.calleridspoofing.info/.

* cited by examiner

*Primary Examiner* — Hemant Patel
(74) *Attorney, Agent, or Firm* — Okamoto & Benedicto LLP

(57) ABSTRACT

A caller ID verifier may be employed to protect telephone users against caller ID spoofing. The caller ID verifier may be implemented in a telephony apparatus, such as a smart phone, stand alone caller ID device, or telephone network infrastructure, for example. Telephone numbers of related callers may be grouped into caller groups. The caller ID verifier may be configured to play one of several audio messages depending on the caller group of the telephone number corresponding to the caller ID of the telephone call. An audio message may include a question. The caller ID verifier may forward the telephone call to the telephone user when the caller answers the question correctly. Otherwise, the caller ID verifier may terminate the telephone call and give the telephone user the option to return the telephone call using the caller ID.

20 Claims, 4 Drawing Sheets

TECHNIQUES FOR PROTECTING TELEPHONE USERS FROM CALLER ID SPOOFING ATTACKS

BACKGROUND OF THE INVENTION

1. Field of the Invention

The present invention relates generally to telephone communications, and more particularly but not exclusively to methods and apparatus for protecting telephone users from caller ID spoofing.

2. Description of the Background Art

Caller ID (identification) allows a telephone user to identify a caller before answering a telephone call. A caller ID corresponds to the caller's telephone number and is displayed on the called party's telephone or caller ID apparatus. This allows the called party to make an informed decision as to whether or not to answer the call. Telephone users have relied on caller ID to screen unwanted callers, such as telemarketers, fraudsters, and the like. The advent of caller ID spoofing techniques makes caller ID unreliable. In particular, voice over Internet protocol (VOIP) has allowed "spoofing", i.e., faking, of caller ID relatively easy. With caller ID spoofing, the displayed caller ID seen by the called party is not the real telephone number of the caller. Caller ID spoofing is dangerous because callers can abuse it to impersonate banks, friends and family, credit card companies, and other trusted callers by faking the caller ID to display the trusted caller's telephone number. Worse, there are publicly available caller ID spoofing services, such as those provided by Spoofcard, PhoneGangster, Spooftel, and Telespoof.

SUMMARY

A caller ID verifier may be employed to protect telephone users against caller ID spoofing. The caller ID verifier may be implemented in a telephony apparatus, such as a smart phone, stand alone caller ID device, or telephone network infrastructure, for example. Telephone numbers of related callers may be grouped into caller groups. The caller ID verifier may be configured to play one of several audio messages depending on the caller group of the telephone number corresponding to the caller ID of the telephone call. An audio message may include a question. The caller ID verifier may forward the telephone call to the telephone user when the caller answers the question correctly. Otherwise, the caller ID verifier may terminate the telephone call and give the telephone user the option to return the telephone call using the caller ID.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
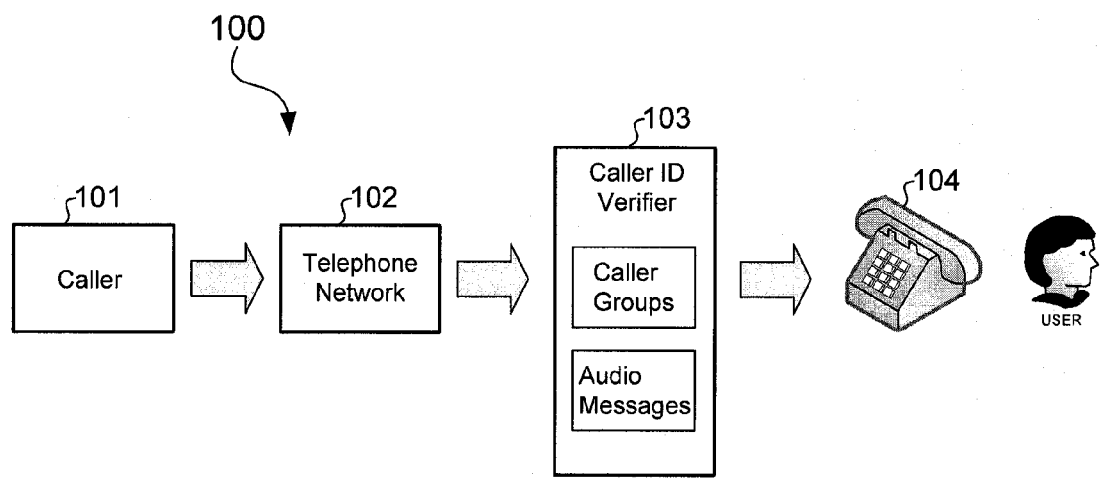
FIG. 1 schematically shows general implementation of a caller ID verifier in accordance with an embodiment of the present invention.

FIG. 1 schematically shows how a caller ID verifier 103 may be deployed to protect a telephone user, also referred to herein as the "called party", from caller ID spoofing in accordance with an embodiment of the present invention. In the example of FIG. 1, a caller 101 makes a telephone call to the telephone user having a telephone 104. The telephone call is made over a telephone network 102, which may comprise a computer network that includes the Internet coupled to the Public Switched Telephone Network (PSTN).

The caller ID verifier 103 may comprise software, hardware, or combination of software and hardware components for protecting the user from caller ID spoofing. For example, the caller ID verifier 103 may comprise electrical circuitry, such as programmable controllers with processor and memory. As another example, the caller ID verifier 103 may comprise computer-readable program code running in memory and executed by a processor. As will be more apparent below, the caller ID verifier 103 may be implemented in or as a telephony apparatus, such as a telephone, a stand alone device between a telephone and a subscriber line circuit, or integrated into infrastructure of the telephone network 102.

In one embodiment, the caller ID verifier 103 is configured to receive the caller ID of an incoming telephone call and issue a challenge to the caller to verify the caller ID. The challenge may be in the form of a question included in an audio message. The audio message played to the caller may be based on the caller group the caller ID belongs to, if any. Another audio message may be played to the caller if the caller ID does not belong to any caller group. The caller ID verifier 103 may deem the caller ID spoofed or real depending on the answer given by the caller in response to the question. If the caller ID verifier 103 deems the caller ID to be real, the caller ID verifier 103 may allow the telephone call to be forwarded to the telephone 104. Otherwise, the caller ID verifier 103 may perform a predetermined action, such as playing some other audio message then terminating the telephone call.

In one embodiment, the caller ID verifier 103 allows the user to create several caller groups. Each caller group may comprise telephone numbers of related callers belonging to the user's contact list. For example, the user may create four caller groups as follows:

a) Family Members
b) Colleagues
c) Schoolmates
d) Others

In the above example, the Family Members caller group may comprise telephone numbers of family members, the Colleagues caller group may comprise telephone numbers of co-workers, the Schoolmates caller group may comprise telephone numbers of schoolmates, the Others caller group may comprise telephone numbers of other callers. Each caller in the user's contact list may be assigned to a unique caller group, which in the above example is one of Family Members, Colleagues, Schoolmates, and Others caller groups.

Each caller group may be assigned a unique audio message to be played to a caller that purportedly belongs to that caller group. The audio message for a caller group may include a question that callers from the caller group likely know the answer to. The question preferably has a numeric answer to allow the caller to answer the question using a telephone keypad. Using the above caller group examples, the audio messages may be as follows:

a) For the Family Members caller group: "What year was I born?"

b) For the Colleagues caller group: "Which building do I work in?"

c) For the Schoolmates caller group: "What year did I graduate?"

In one embodiment, callers in the Others caller group are those the user specifically do not want to receive calls from. For example, for the Others caller group, the audio message may be "I am busy right now and will return your call later. If I need an extension number to reach you, please enter it now."

In one embodiment, the caller ID verifier 103 deems a caller that does not belong to any of the caller groups as belonging to the Others caller group. The Others caller group is deemed as a default caller group in that embodiment. If an incoming telephone call has a caller ID that does not belong to any of the caller groups, that telephone call is treated as coming from a caller in the default caller group.

In one embodiment, the caller ID verifier 103 is configured to block telephone calls that do not have a caller ID. If a telephone call without caller ID is received, the caller ID verifier 103 may play an audio message informing the caller that the user does not accept calls from telephones without caller ID.

Figure 2:
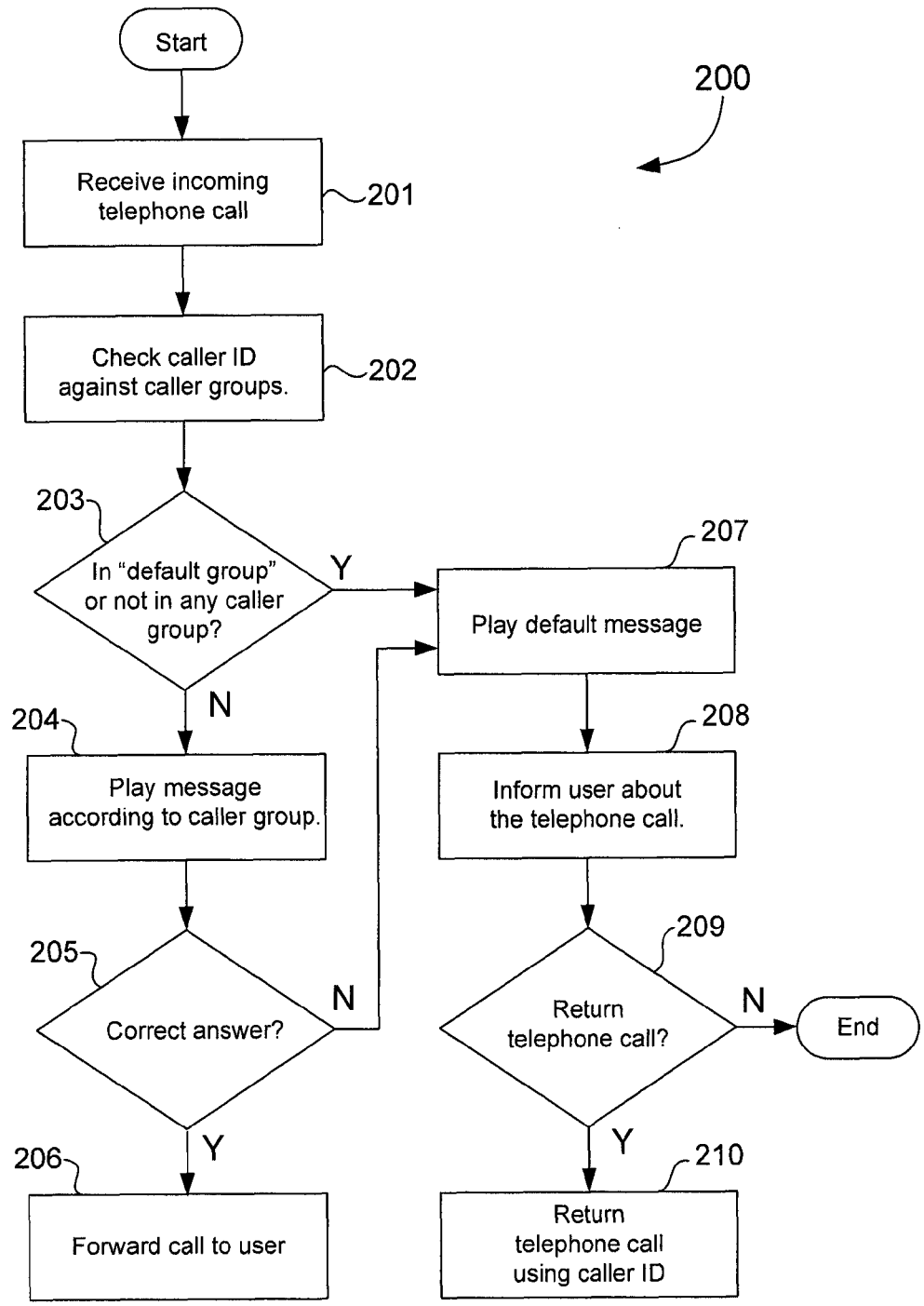
FIG. 2 shows a flow diagram of a method of protecting telephone users from caller ID spoofing in accordance with an embodiment of the present invention.

FIG. 2 shows a flow diagram of a method 200 of protecting telephone users from caller ID spoofing in accordance with an embodiment of the present invention. The method 200 may be performed by the caller ID verifier 103 in the example of FIG. 1.

The method 200 begins when the caller ID verifier 103 receives an incoming telephone call from the caller 101 (step 201). The caller ID verifier 103 receives the caller ID of the incoming telephone call and checks it against telephone numbers in the caller groups (step 202). If the caller ID matches a telephone number belonging to a caller group other than the default caller group (which is the Others caller group in this example) the caller ID verifier 103 plays the audio message for that caller group (step 203 to step 204). The caller ID verifier 103 waits for the caller to answer the question in the audio message, and may be configured to time out and hang up to terminate the telephone call when the caller fails to enter an answer within a predetermined amount of time.

The caller ID verifier 103 checks the caller's answer to the question in the audio message (step 205). If the answer is correct, the caller ID verifier 103 deems the caller ID of the caller to be real (i.e., not spoofed) and forwards the call to the user by ringing the telephone 104 (step 205 to 206). Otherwise, when the answer is incorrect, the caller ID verifier 103 plays the default audio message to the caller 101 (step 205 to step 207). The caller ID verifier 103 also plays the default audio message when the caller ID matches a telephone number in the default caller group or when the caller ID does not belong to any of the caller groups recognized by the caller ID verifier 103 (step 203 to step 207). The default audio message may solicit an extension number of the caller, if applicable.

The caller ID verifier 103 may thereafter hang up to terminate the telephone call when the answer is incorrect or the caller ID belongs to the Others caller group.

The caller ID verifier 103 may call the telephone 104 to play an audio message informing the user that a telephone call with an unverifieable caller ID was received (step 208). The audio message may ask the user whether or not to return the call. For example, the audio message may ask the user to use the keypad of the telephone 104 to enter "1#" to return the call or "2#" to ignore the call. The telephone 104 may include an indicator (e.g., icon, flashing light, particular dial tone sound, message on an LCD display or user interface, particular ring tone, etc.) to indicate when a call with an unverifiable caller ID was received. The method 200 ends when the user does not want to return the call (step 209 to end). If the user wants to return the call, the caller ID verifier 103 may return the call using the caller ID of the telephone call, and the extension number if applicable (step 209 to step 210). Because the return call is using the caller ID, the caller would reach the actual telephone represented by the caller ID. This advantageously protects the user from callers using spoofed caller ID.

Figure 3:
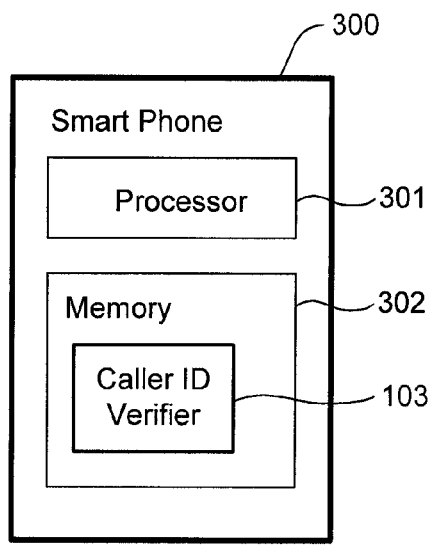
FIG. 3 schematically shows a smart phone with a caller ID verifier in accordance with an embodiment of the present invention.

The caller ID verifier 103 may be implemented a variety of ways without detracting from the merits of the present invention. For example, the caller ID verifier 103 may be implemented in a wireless smart telephone ("smart phone") 300 as shown in FIG. 3. In the example of FIG. 3, the caller ID verifier 103 is implemented as computer-readable program code running in a memory 302 and executed by a processor 301 of the smart phone 300. The smart phone 300 serves the combined functions of the caller ID verifier 103 and the telephone 104 of FIG. 1, and performs the steps of the method 200. As can be appreciated, the smart phone 300 may instead be a wired landline telephone, such as the new generation of telephones with processor and memory.

Figure 4:
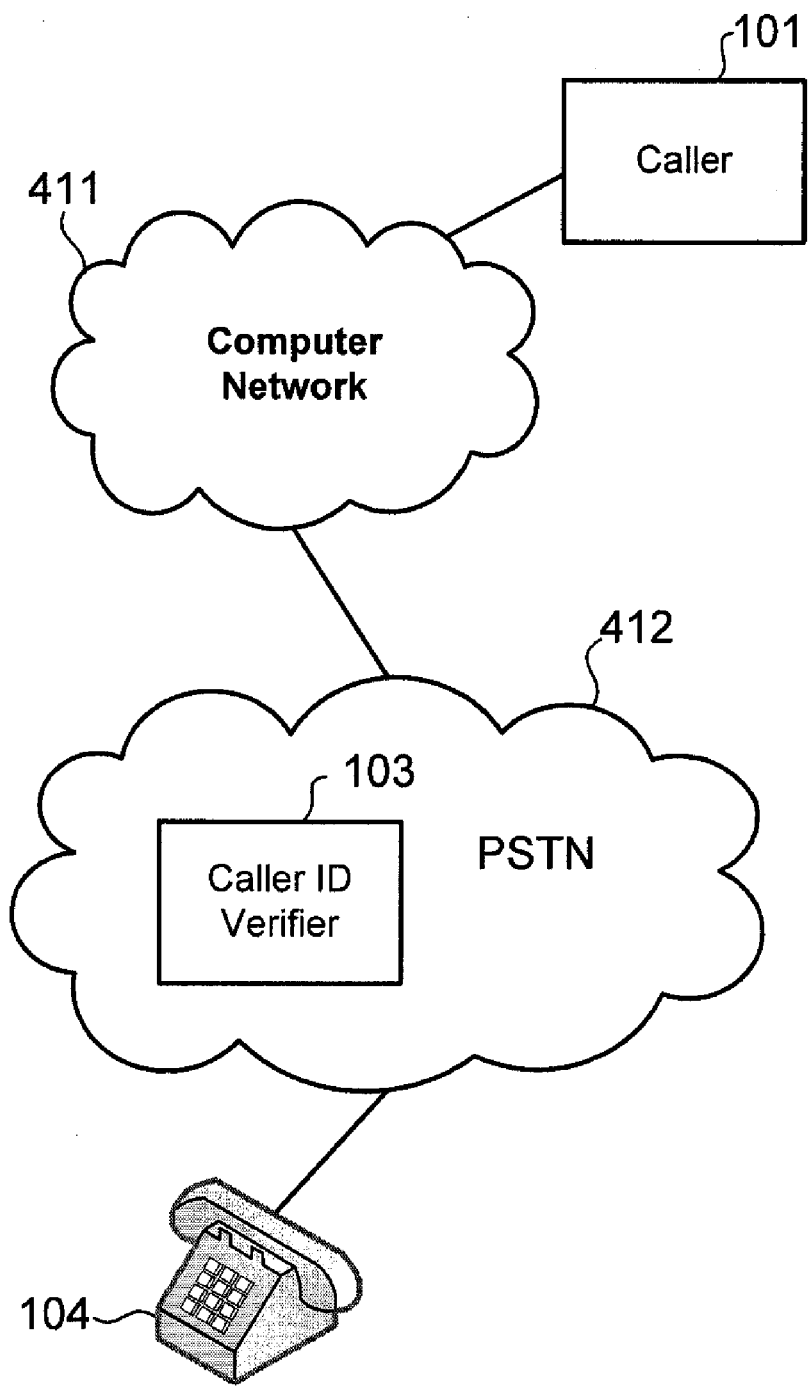
FIG. 4 schematically shows telephone network infrastructure with a caller ID verifier in accordance with an embodiment of the present invention.

Instead of integrating the caller ID verifier 103 with the telephone 104, the caller ID verifier 103 may be integrated in the infrastructure of the telephone network 102. This is shown in FIG. 4, where the caller ID verifier 103 is schematically shown as being in the infrastructure of the PSTN 412. In the example of FIG. 4, the method 200 is performed by infrastructure of the PSTN 412. For example, the caller ID verifier 103 may be integrated with switching apparatus or other equipment of the PSTN 412. The PSTN 412 may be coupled to the computer network 411 to receive a telephone call from the caller 101. This is a typical scenario due to proliferation of caller ID spoofing services on the Internet. The computer network 411 and the PSTN 412 represents the telephone network 102 of FIG. 1.

Figure 5:
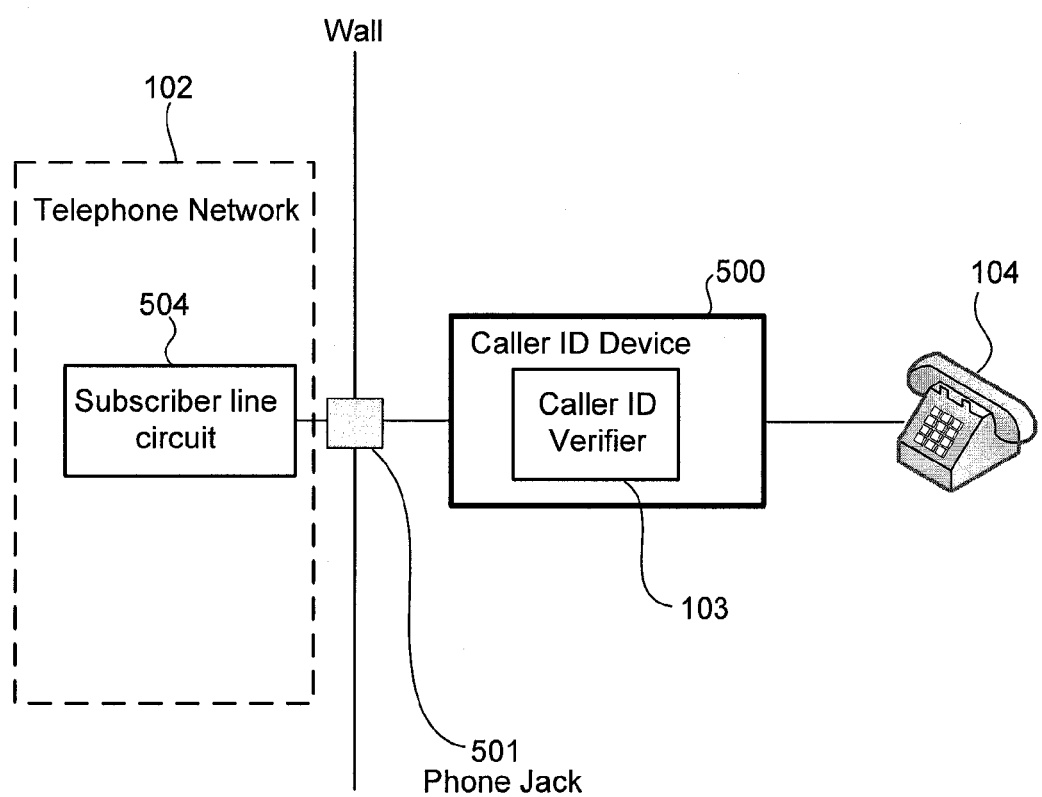
FIG. 5 schematically shows a stand alone caller ID device with a caller ID verifier in accordance with an embodiment of the present invention.

The caller ID verifier 103 may also be implemented in a stand alone caller ID device 500. The caller ID device 500 may be placed between the telephone 104 and a subscriber line circuit 504 of the telephone network 102. The caller ID device 500 may comprise a stand alone answering machine, caller ID displayer, or other stand alone telephony apparatus. In the example of FIG. 5, the caller ID device 500 is plugged into a wall telephone jack 501. The telephone 104 is plugged into the caller ID device 500 to couple to the telephone network 102 by way of the subscriber line circuit 504. Telephone calls to the telephone 104 are received by the caller ID device 500, which performs the steps of the method 200 to protect the telephone user from caller ID spoofing.

Methods and apparatus for protecting telephone users against caller ID spoofing have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed by a telephony apparatus to protect telephone users from caller ID spoofing, the method comprising:
   receiving an incoming telephone call in the telephony apparatus, the telephone call being for a telephone user;
   checking a caller ID of the telephone call against a plurality of caller groups, each caller group in the plurality of caller groups comprising telephone numbers of related callers belonging to the telephone user's contact list and is associated with an audio message in a plurality of audio messages, each audio message in the plurality of audio messages including a question that callers from a corresponding caller group know the answer to based on the callers' relationship with the telephone user;
   playing a first audio message in the plurality of audio messages when the caller ID of the telephone call corresponds to a telephone number in a first caller group in the plurality of caller groups;
   receiving a first answer to a first question in the first audio message; and
   forwarding the telephone call to the telephone user when the first answer is correct.

2. The method of claim 1 wherein the telephony apparatus comprises a stand alone caller ID device.

3. The method of claim 1 wherein the telephony apparatus comprises a wireless smart telephone.

4. The method of claim 1 wherein the telephony apparatus comprises equipment in an infrastructure of a public switched telephone network (PSTN).

5. The method of claim 1 further comprising:
   playing a second audio message in the plurality of audio messages when the caller ID of the telephone call corresponds to a telephone number in a second caller group in the plurality of caller groups;
   receiving a second answer to a second question in the second audio message; and
   forwarding the telephone call to the telephone user when the second answer is correct.

6. The method of claim 1 further comprising:
   playing a third audio message in the plurality of audio messages when the first answer is incorrect.

7. The method of claim 6 wherein the third audio message asks a caller that originates the telephone call to enter an extension number.

8. The method of claim 1 further comprising:
   terminating the telephone call when the first answer is incorrect.

9. The method of claim 8 further comprising:
   playing another audio message to the telephone user asking if the telephone user wants to return the telephone call when the first answer is incorrect.

10. The method of claim 9 further comprising:
    returning the telephone call by calling back a telephone number indicated by the caller ID.

11. A telephony apparatus comprising:
    a caller ID verifier configured to receive an incoming telephone call originated by a caller to call a telephone user, check a caller ID of the telephone call against telephone numbers in a caller group in a plurality of caller groups, play a first audio message to the caller, receive an answer to a question in the audio message, and forward the telephone call to the telephone user when the answer is correct, wherein each caller group in the plurality of caller groups comprises telephone numbers of related callers belonging to the telephone user's contact list and wherein the answer to the question is known to callers in the caller group based on the callers' relationship to the telephone user.

12. The telephony apparatus of claim 11 wherein the telephony apparatus comprises a wireless smart telephone.

13. The telephony apparatus of claim 11 wherein the telephony apparatus comprises a stand alone caller ID device.

14. The telephony apparatus of claim 11 wherein the caller ID verifier is configured to terminate the telephone call when the answer is incorrect.

15. The telephony apparatus of claim 11 wherein the caller ID verifier is configured to ask the telephone user to return the telephone call using the caller ID when the answer is incorrect.

16. A method to be performed by a telephony apparatus to protect telephone users from caller ID spoofing, the method comprising:
    receiving a telephone call in the telephony apparatus, the telephone call being originated by a caller and for a telephone user;
    identifying a caller group in a plurality of caller groups that a telephone number of the caller belongs to, each caller group in the plurality of caller groups comprising telephone numbers of related callers belonging to the telephone user's contact list;
    playing an audio message to the caller, the audio message being selected to be played to the caller based on the caller group, the audio message including a question having an answer that is known to callers in the caller group based on the callers' relationship to the telephone user;
    receiving the answer to the question included in the audio message; and
    deeming a caller ID of the caller to be verified when the answer is correct.

17. The method of claim 16 further comprising:
    forwarding the telephone call to a telephone user when the caller ID is verified.

18. The method of claim 16 further comprising:
    terminating the telephone call when the answer is incorrect.

19. The method of claim 16 further comprising:
    playing another audio message to the telephone user asking if the telephone user wants to return the telephone call when the answer is incorrect.

20. The method of claim 19 further comprising:
    returning the telephone call by calling back a telephone number indicated by the caller ID.

* * * * *